United States Patent [19]

Miyamoto et al.

[11] Patent Number: 5,381,178
[45] Date of Patent: Jan. 10, 1995

[54] RECORDING APPARATUS WITH OVERRIDING DISPLAY CONDITIONS

[75] Inventors: Ryosuke Miyamoto; Shinji Sakai, both of Kanagawa, Japan

[73] Assignee: Canon Kabushiki Kaisha, Tokyo, Japan

[21] Appl. No.: 226,402

[22] Filed: Apr. 12, 1994

Related U.S. Application Data

[63] Continuation of Ser. No. 106,194, Aug. 12, 1993, abandoned, which is a continuation of Ser. No. 841,242, Feb. 24, 1992, abandoned, which is a continuation of Ser. No. 711,264, Jun. 4, 1991, abandoned, which is a continuation of Ser. No. 598,797, Oct. 15, 1990, abandoned, which is a continuation of Ser. No. 467,318, Jan. 18, 1990, abandoned, which is a continuation of Ser. No. 51,047, May 15, 1987, abandoned.

[30] Foreign Application Priority Data

May 21, 1986 [JP] Japan .................. 61-116373

[51] Int. Cl.⁶ .......................................... H04N 5/225
[52] U.S. Cl. ...................................... 348/333; 348/372
[58] Field of Search ............... 340/756; 358/906, 909; 360/60, 69, 75, 78.04, 137; 348/207, 333, 334, 372

[56] References Cited

U.S. PATENT DOCUMENTS

| | | | |
|---|---|---|---|
| 3,004,190 | 10/1961 | Bowerman, Jr. et al. | 340/756 X |
| 3,953,868 | 4/1976 | Kawamura et al. | 354/109 |
| 4,070,649 | 1/1978 | Wright, Jr. et al. | 340/756 X |
| 4,206,483 | 6/1980 | Nakamura | 360/33.1 |
| 4,365,881 | 12/1982 | Hazama et al. | 354/76 |
| 4,420,773 | 12/1983 | Toyoda et al. | 358/335 |
| 4,456,931 | 6/1984 | Toyoda et al. | 358/909 |
| 4,602,299 | 7/1986 | Saito | 360/60 |
| 4,608,613 | 8/1986 | Miyake | 360/78 |
| 4,686,587 | 8/1987 | Hipp et al. | 360/69 |
| 4,691,252 | 9/1987 | Okada et al. | 360/75 |
| 4,693,574 | 9/1987 | Ohnuki et al. | 354/21 |
| 4,733,314 | 3/1988 | Ogawa et al. | 360/71 |
| 4,734,799 | 3/1988 | Miyake | 360/78 |
| 4,783,707 | 11/1988 | Nemoto et al. | 360/10.1 |
| 4,806,960 | 2/1989 | Momot et al. | 354/21 |

OTHER PUBLICATIONS

*Popular Photography*, "The Future Arrives", Jul. 1986, pp. 62-63.

*KodaVision Series 2000 Camcorders 2200 and 2400 User's Guide*, Jun. 1984, Eastman Kodak Company, assorted pages.

Primary Examiner—David L. Robertson
Attorney, Agent, or Firm—Robin, Blecker, Daley & Driscoll

[57] ABSTRACT

A recording apparatus is disclosed which comprises a recording head accessible to a variable recording position on a recording medium; a 7-segment display device to display the variable recording position accessed by the recording head; a detecting member for detecting operating conditions of the recording medium, for example, the presence of the recording medium and the inhibition from recording of the recording medium; and a control circuit for causing the display device to display information on a predetermined operating condition of the recording medium in lieu of the recording position accessed by the recording head when the predetermined operating condition is detected by the detecting means.

12 Claims, 5 Drawing Sheets

FIG.5
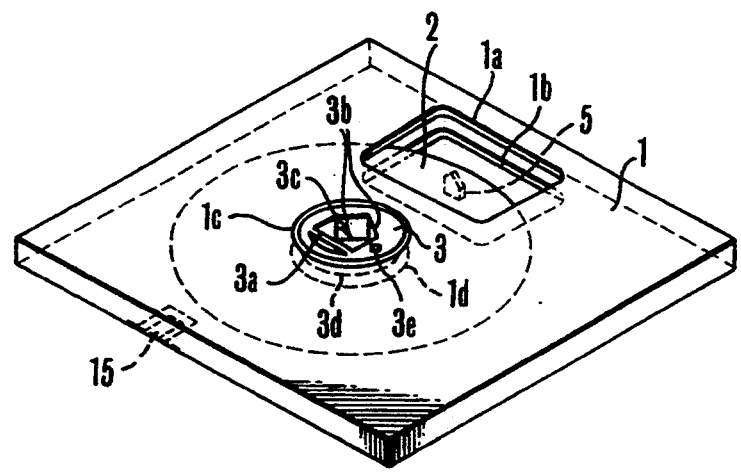
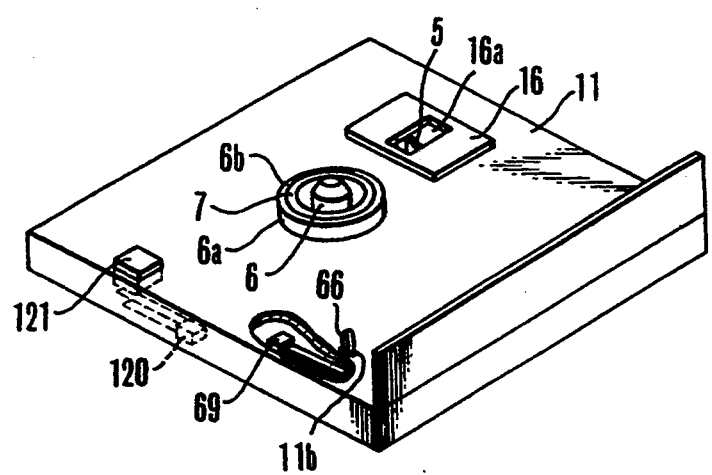

RECORDING APPARATUS WITH OVERRIDING DISPLAY CONDITIONS

This is a continuation application under 37 CFR 1.62 of prior application Ser. No. 08/106,194, filed Aug. 12, 1993, which is a continuation of Ser. No. 07/841,242 filed Feb. 24, 1992, which is a continuation of Ser. No. 07/711,264 filed Jun. 4, 1991, which is a continuation of Ser. No. 07/598,797 filed Oct. 15, 1990, which is a continuation of Ser. No. 07/467,318 filed Jan. 18, 1990, which is a continuation of Ser. No. 07/051,047 filed May 15, 1987, all now abandoned.

BACKGROUND OF THE INVENTION

1. Field of the Invention

The present invention relates to a recording apparatus using a replaceable recording medium, like ordinary cameras and electronic still cameras, particularly a recording apparatus that can provide a variety of displays by using display devices such as Liquid crystal displays (LCDs) and light emitting diode; (LEDs).

2. Description of the Related Art

For the conventional cameras such as silver-halide film cameras, the use of display means has been generally known wherein a variety of information such as program mode, number of film frames, operating conditions of a camera, etc. was provided on display devices as described above.

On the other hand, for a recording apparatus, for example, an electronic still camera, using a magnetic recording medium such as a floppy disk, it has been necessary to display track numbers in lieu of the number of film frames.

In this case, when a floppy disk was set in a camera, it was required for the camera to check the conditions of the disk at first. Particularly, the camera was required to check and inform the user of the conditions of the floppy disk such as if the disk had recorded information on the tracks up to a certain track number, or if the disk was disabled for writing.

However, the troublesome addition of a display unit to indicate the specific conditions of a floppy disk resulted in disadvantages such as a problem of space, a user's feeling of incompatibility due to a difference of display mode from the conventional cameras using silver-halide films, and inconveniences in designing. Consequently, such means has been desired that can display the conditions of the floppy disk in the same mode as the silver-halide film camera can display the information such as program mode, number of film frames and camera operations, when the floppy disk is set in a camera.

SUMMARY OF THE INVENTION

An object of the present invention is to provide a recording apparatus using a replaceable recording medium and having display means for displaying the necessary information to be recorded in the recording medium, which has an adequate construction and configuration to permit the use of a display unit for the information of the recording medium as well as the ordinary camera information, so that the limited display space can be more effectively used.

Another object of the present invention is to display the information of the recording medium visibly for the user.

According to a preferred embodiment of the present invention to attain these objects, a recording apparatus is disclosed which comprises a recording head accessible to a variable recording position on the recording medium; means for displaying the recording position accessed by the recording head; means for detecting the operating conditions of the recording medium; and controlling means for allowing the displaying means to display the information of the operating conditions in lieu of the recording position when the information of the operating conditions has been detected by the detecting means.

Further, another object of the present invention is to provide a recording apparatus comprising displaying means having a calendar or time display facility, wherein the configuration is more simplified by using the displaying means also for the operating conditions of the recording medium.

These and other objects and features of the present invention will be better understood by reading the description of embodiments according to the present invention on referring to the drawings annexed hereto.

BRIEF DESCRIPTION OF THE DRAWINGS

FIG. 5 is a pair of perspectives showing the construction of a cassette and a mounting part on which the switches as shown in FIG. 1 are located.

DETAILED DESCRIPTION OF THE PREFERRED EMBODIMENTS

Figure 1:
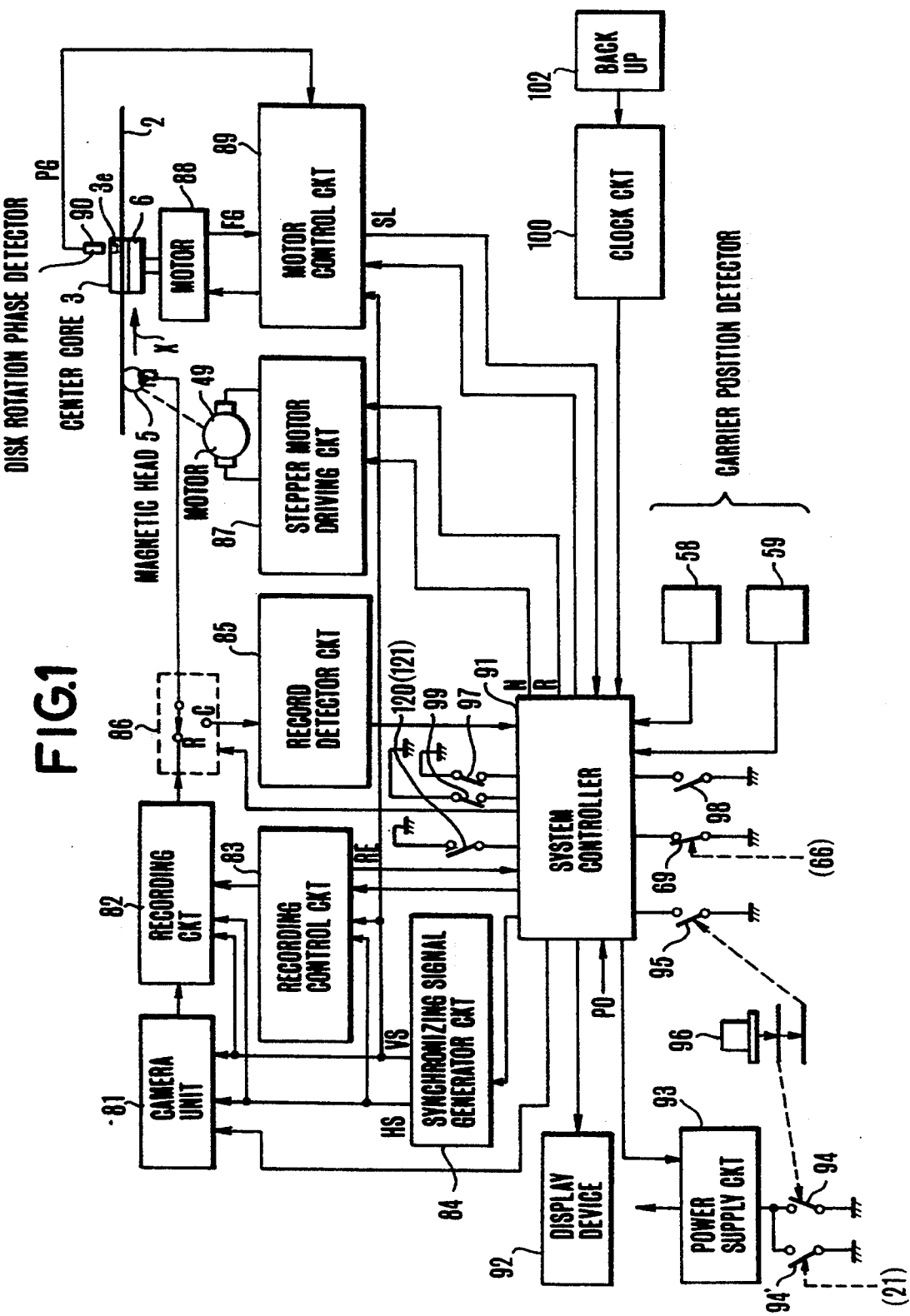
FIG. 1 is a block diagram showing an embodiment according to the present invention.

FIG. 1 is a block diagram showing the configuration of a recording apparatus as an embodiment according to the present invention, that is, the configuration of a circuitry in a still video recording apparatus to which the present invention is applied.

In FIG. 1, 81 is a camera unit forming video signals and having a known configuration, 82 is a recording circuit that records the video signal output of the camera unit 81 onto a magnetic disk 2 through a magnetic head 5, and 83 is a recording control circuit that controls the recording circuit 82 to make it record a field or frame of video signals.

A synchronizing signal generator circuit 84 produces vertical synchronizing signals HS, VS, etc., which are supplied to the camera unit 81, the recording circuit 82, the recording control circuit 83, and the disk motor control circuit 89 as described hereinafter.

The recording control circuit 83 delivers a "End of Record" signal RE when the recording head 5 completes the recording operation.

85 is a record detector circuit that detects the presence of any record or video signals at every recording position on the disk 2 through the head 5.

86 is a selector switch that connects the head 5 selectively to the output of the recording circuit 82 (through the terminal R) or the input of the record detector circuit 85 (through the terminal C).

A stepper motor driving circuit 87 drives a stepper motor 49 for driving the head 5, and it is driven in synchronism with the FG pulse as described hereinafter.

A disk driving motor 88 rotates the disk 2 through a spindle 6.

89 is a disk motor control circuit that controls the disk motor 88. In this embodiment, the control circuit 89 controls the disk motor 88 so that the disk 2 will be rotated at a predetermined speed corresponding To the television field or frame frequency (3,600 to 1,800 rpm in the NTSC mode) and in a certain phase to the timing of the vertical synchronizing signal VS, based upon a reference speed signal delivered by a reference oscillator in the disk motor control circuit 89, a rotational speed signal FG delivered by the motor 88 at the rate of 16 equally-spaced pulses per rotation, a vertical synchronizing signal VS supplied by the synchronizing signal generator circuit 84, and a disk rotation phase signal PG delivered by a disk rotation phase detector 90 that detects a magnetic pin 3e anchored in the center core 3 of the disk 2.

The disk motor control circuit 89 delivers a servo lock-in signal SL when the disk motor 88 reaches the predetermined speed and phase.

A system controller 91 controls the whole circuitry as shown in FIG. 1. The system controller 91 is connected to a recording trigger switch 95, a mode selector switch 97, a cassette detector switch 69 operating in response to a cassette detecting lever 66, a carrier position detector 58 that detects the access position of the head 5 located on the 51st track on the magnetic disk 2, a carrier position detector 59 that detects the access position of the head 5 located on the first track on the magnetic disk 2, and a detector switch 120 to be used to detect the presence of an erroneous-erasion preventing claw 15, and actuated with the "End of Record" signal RE from the recording control circuit 83, the servo lock-in signal SL from the motor control circuit 89, and the power-on signal PO from the power supply when it is turned on. These devices and signals will be described hereinafter.

92 is a display device containing light emitting or sounding elements.

93 is a power supply circuit containing a battery and provided with power switches 94 and 94'. The power switch 94' is opened in response to a lock lever 21. 95 is a recording trigger switch. 96 is a trigger button to actuate the switches 94 and 95. In this embodiment, the trigger button 96 turns on the power switch 94 by the 1st step of pressing, and the recording trigger switch 95 by the 2nd step of pressing.

A mode selector switch 97 selects the single exposure mode (wherein a field or frame of information is recorded by one operation of the trigger switch 95) or the continuous exposure mode (wherein the recording operation is repeated at the predetermined rate as long as the trigger switch 95 is set in ON). The single or continuous exposure mode is selected by turning on or off the mode selector switch 97 respectively.

It is to be understood that the trigger button 96 may actuate only the trigger switch 95, while the power switch 94 is separately actuated by the other device.

The record detector circuit 85 detects the presence of an RF (radio frequency) signal if the recorded signal is an FM signal, and delivers a high-level signal when it has detected any record.

The system controller 91 samples the output level of the RF signal detected by the detector circuit 85, for example, on a track in the timing of the FG signal, confirms that RF points are present at FG points on the track respectively if the RF output levels detected are equal to or more than a predetermined value and that the track has a record if the number of RF points present on the track reaches a predetermined value, and carries the head 5 to the next track without checking the remaining FG points on the track. Therefore, the checking operation will surely take shorter time, when the track has a record.

The construction of a cassette detector switch 69 and a detector switch 120 for detecting the presence of the erroneous-erasion preventing claw 15 of the cassette 1 will be described below by referring to FIG. 5.

FIG. 5 is a pair of perspectives illustrating the construction of the cassette 1 holding the magnetic disk 2 as well as the construction of the mounting part for the cassette 1.

In FIG. 5, the magnetic disk 2 is provided with a center core 3 made of plastic or the like at its center. A magnetic plate 3d is bonded on the back face of the center core 3 as the mounting part for the cassette 1, and provided with a magnetic pin 3e penetrating the center core 3. The cassette 1 is provided with an upper-sided opening 1a and a lower-sided opening 1b in which an upper stabilizer plate (not shown) and a lower stabilizer plate 16 can be fitted respectively to stabilize the rotations of the magnetic disk 2. And the magnetic recording head 5 moving along an opening 16a is faced to the recording surface of the magnetic disk 2 through the lower-sided opening 1b so that it will be able to come in contact with or approach to the recording surface of the disk 2.

The center core 3 is mounted on a disk driving spindle 6 in the mounting part for the cassette i. For this, the center core 3 is provided with a fitting hole 3c defined by two inclined faces 3b and spring part 3a of the center core 3. The spindle 6 is tightly fitted in the hole 3c by the force of the spring part 3a which brings the inclined faces 3b in contact with the spindle 6. The flange part 6a of the spindle 6 is equipped with a permanent magnet 7, which acts on the magnetic plate 3d mounted on the back face of the center core 3. The magnetic plate 3d is attracted by the permanent magnet so that the center core 3 is magnetically engaged with the spindle 6 (by the so-called magnetic chucking). In this case, the height of the magnetic disk 2 relative to the head 5 is determined by the back face of the center core 3 coming in contact with the flange face 6b of the flange part 6a on the spindle 6.

The cassette 1 is also provided with an uppersided opening 1c and a lower-sided opening 1d in which the center core 3 is fitted.

The erroneous-erasion preventing claw 15 mounted on the cassette 1 is engaged with a detector member 121 when the cassette 1 is mounted on the spindle 6. When the claw 15 is not folded, the detector member 121 is pressed by the claw 15 to turn on the switch 120. When the claw 15 is folded, the detector member 121 is not pressed by the claw 15 to leave the switch 120 in OFF state.

When the cassette 1 is mounted on the spindle 6, a detector member 66 is pressed to turn on the switch 69. When the cassette 1 is not mounted on the spindle 6, the detector member 66 is not pressed to leave the switch 69 in OFF state.

The operations of the embodiment thus constructed will be described below on referring to FIG. 2, which is a flow chart showing a control procedure example of the system controller 91.

Figure 3:
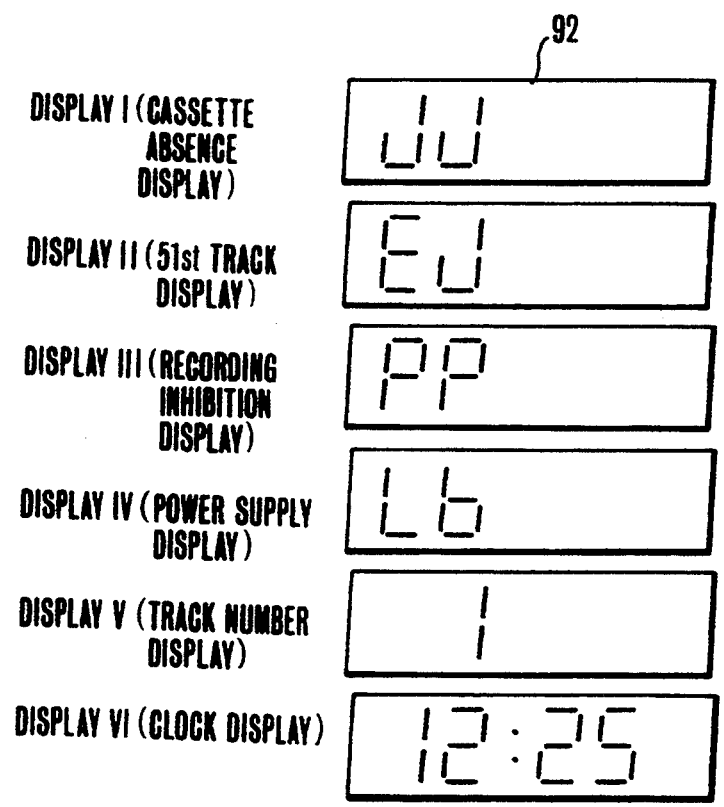
FIG. 3 shows letter pattern examples as displayed in the segments for track number.

FIG. 3 shows letter pattern examples displayed by the display device 92 which comprises a 7-segment display element to display the track number.

In the step S1, the power supply circuit 93 is turned on by means of the switch 94, and the control is shifted to the step S2.

In the step S2, the system controller 91 checks the power supply voltage of the power supply circuit 93. If the power supply voltage is lower than a predetermined value, the control is shifted to the step S16 where the display IV "Lb" shown in FIG. 3 is provided, and to the step S17 where the power supply circuit 93 is turned off to complete the control.

If the power supply voltage is equal to or higher than the predetermined value in the step S2, the control is shifted to the step S3 where it is checked if the cassette detector switch 69 is set in ON, that is, if the cassette 1 is present.

If the cassette 1 is absent, the control is shifted to the step S14 where the display I "JJ" is provided, and to the step S15 where the power supply is turned off to complete the control.

If the cassette 1 is detected in the step S3, the control is shifted to the step S4 where it is confirmed that the cassette 1 has been inhibited from recording. If the cassette 1 has been inhibited from recording, the control is shifted to the step S12 where the display III "PP" is provided, and to the step S13 where the power supply is turned off to complete the control.

If the cassette 1 has not been inhibited from recording in the step S4, the control is shifted to the step S5 where the preparatory operations are performed for recording.

In the step S5, the system controller 91 actuates the stepper motor 49 to drive the magnetic head 5 and the motor 88 to drive the magnetic disk 2 so that any recordable tracks are searched.

In the next step S6, the system controller 91 checks if the current position of the head 5 is located on the 51st track.

If it is on the 51st track, the control is shifted to the step S9 where the display II "EJ" is provided, to the step S10 where the recording is prohibited, and to the step S11 where the power supply is turned off.

If the head 5 is not on the 51st track in the step S6, the control is shifted to the step S7 where the track number corresponding to the head position is displayed (display V), and to the step S8 where the recording operation is started. Then, the controller 91 moves the head 5 onto the next track, and returns to the step S6.

Figure 2:
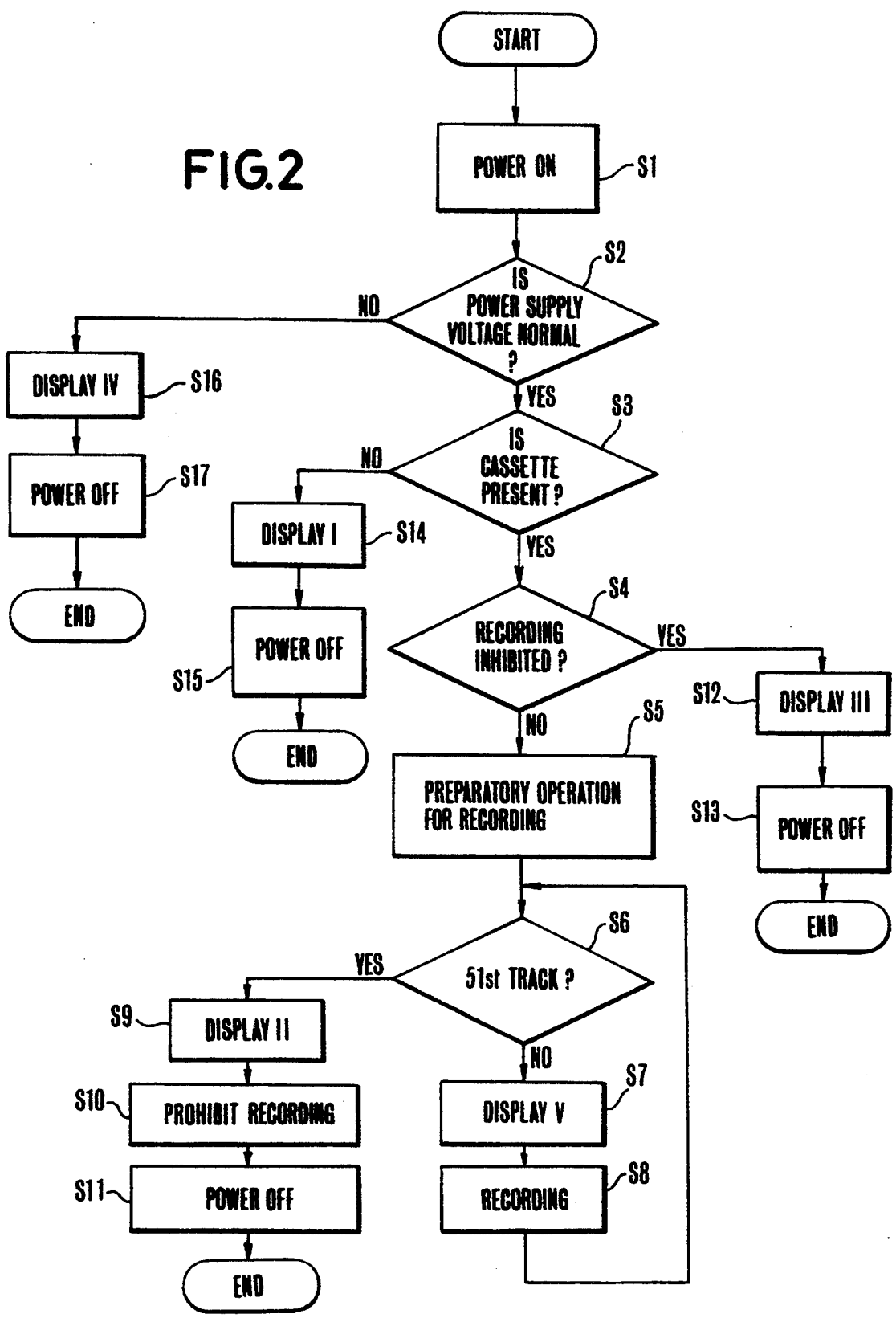
FIG. 2 is a flow chart showing a control procedure example of the system controller as shown in FIG. 1.

A variant of the flow chart as shown in FIG. 2 will be described below in reference to FIG. 4.

In this embodiment, the operations of a recording start switch 99, a clock display switch 98 and a clock circuit 100 as shown in FIG. 1 will be described below. The recording start switch 99 is used to enter into the system controller 91 the command of allowing the recording circuit 82 to start the recording operation. The clock display switch 98 is used to enter the command of clock display on the display device 92. The clock circuit 100 is backed up by a back-up power supply 102 containing a lithium battery.

In this embodiment, the description of the same steps as shown in FIG. 2 will be omitted.

Figure 4:
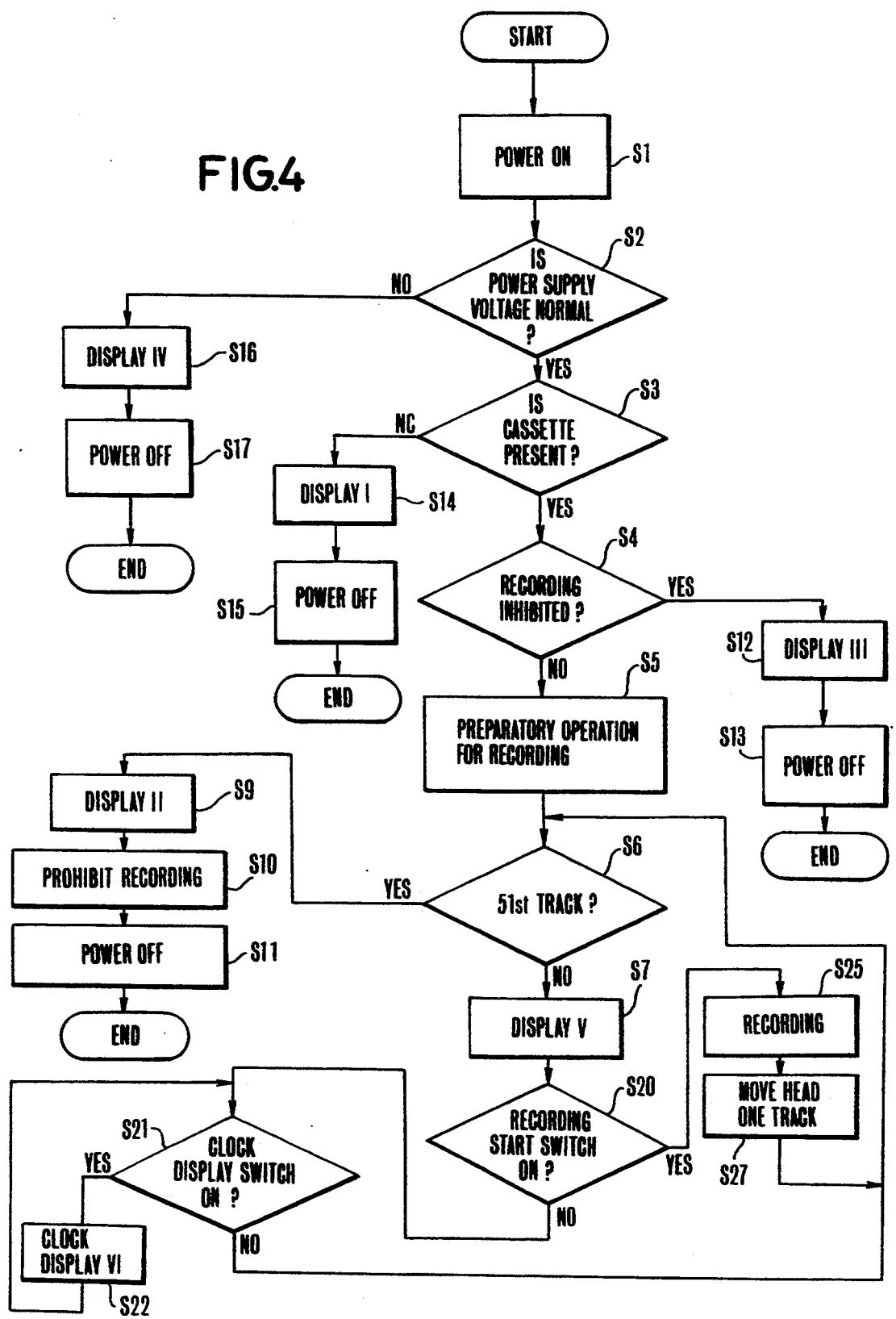
FIG. 4 is a flow chart showing a variant of the control procedure example as shown in FIG. 2.

In FIG. 4, the control is shifted from the step S7 where the track number accessed by the head 5 is displayed, to the step S20 where it is checked if the recording start switch 99 is set in ON. If the switch 99 is set in ON, the control is shifted to the step S25 where the recording circuit 82 starts in recording, and to the step S27 where the stepper motor 49 is driven by the driving circuit 87 to move the head 5 from the current track to the next track in the direction of arrow x shown in FIG. 1. Then, the control is returned to the step S6.

If the recording start switch 99 is not set in ON in the step S20, the control is shifted to the step S21 where it is checked if the clock display switch 98 is set in ON. If the clock display switch 98 is not set in ON, the control is returned to the step S6. If the switch 98 is set in ON, the control is shifted to the step S22 where the display device 92 provides a clock display in lieu of the track number accessed by the head 5. The clock display is as shown by the display VI in FIG. 3. The display VI as shown in FIG. 3 indicates the time "12:25", that is, twenty-five minutes past twelve. Such a clock display is continuously provided as long as the switch 98 is set in ON.

According to this embodiment as described above, the display device is designed so that it can display the time as well as the conditions of the recording medium, for example, the presence of the cassette, the track number and the recording prohibition. Therefore, no additional display device is required to simplify the configuration of the recording apparatus.

In addition to the embodiment as described above, it is possible to use the display device 92 also as an alarm to inform of any unfavorable operation of a camera. For example, if the cassette ejecting lever is operated by the user when the power switch 94 is set in ON, or if the cassette ejecting lever is operated during the operation for recording, the display device 92 may give an alarm to the user by providing the no-cassette display "JJ".

The alarm facility of the display device 92 is very important to prevent any further erroneous operation by the user. Alternatively, such an alarm facility may be incorporated in the finder unit of a camera so that such an alarm will be given to the user during the shooting.

According to the embodiment, as described above, the same display device may display the track number and the operating conditions of a recording medium such as a floppy disk, so that no additional display device is required for the operating conditions of the recording medium, and that the cost and space can De thus economized.

Although the recording apparatus is used to describe the display device according to this embodiment, this display device may be used in an apparatus having only a reproducing facility or both recording and reproducing facilities.

What is claimed is:

1. A recording apparatus comprising:
   recording means for recording an image signal on a recording medium:
   electrical power supply means for supplying electrical power for operating said recording means;
   discriminating means for detecting that a recording operation of said recording means is in progress and producing an output indicative thereof;
   detecting means for detecting whether a supplying capacity of said electrical power supply means is proper or not and producing an output when it is not proper; and
   display means for alternatively effecting a display corresponding to the outputs of said discriminating means and said detecting means, said display means arranged to preferentially display an indication of the output of said detecting means over the output of said discriminating means.

2. An apparatus according to claim 1, wherein said recording medium is a disc.

3. An apparatus according to claim 1, wherein said recording means includes a recording head, and said discriminating means is arranged to discriminate a recording position of said recording head.

4. An apparatus according to claim 1, wherein said electrical power supply means is battery.

5. An apparatus according to claim 1, wherein said display means is a 7 segment display.

6. An apparatus according to claim 1, further comprising:

photoelectric conversion means for photoelectrically converting an image of an object, wherein said recording means is arranged to record an output of said photoelectric conversion means.

7. A recording apparatus comprising recording means for recording an image signal on a recording medium:

discriminating means for detecting that a recording operation of said recording means is in progress and producing an output indicative thereof;

time information generating means for generating a time information signal and producing an output representative thereof; and display means for alternatively effecting a display corresponding to the outputs of said time information generating means and said discriminating means, said display means arranged to preferentially display an indication of the output of said discriminating means over the output of said time information generating means.

8. An apparatus according to claim 7, wherein said recording medium is a disc.

9. An apparatus according to claim 7, wherein said recording medium is detachably attached, and said discriminating means is arranged to discriminate a detached or attached state of said medium.

10. An apparatus according to claim 7, wherein said display means is a 7-segment display.

11. An apparatus according to claim 7, further comprising:

photoelectric conversion means for photoelectrically converting an image of an object, wherein said recording means is arranged to record an output of said photoelectric conversion means.

12. An apparatus according to claim 7, wherein said recording means includes a recording head, and said discriminating means is arranged to discriminate a recording position of said recording head.

* * * * *

UNITED STATES PATENT AND TRADEMARK OFFICE
CERTIFICATE OF CORRECTION

PATENT NO. : 5,381,178
DATED : January 10, 1995
INVENTOR(S) : Ryosuke Miyamoto et al.

It is certified that error appears in the above-identified patent and that said Letters Patent is hereby corrected as shown below:

Col. 1, line 21.  Change "Liquid" to -- liquid --.

Col. 1, line 28.  Change "etc." to -- etc., --.

Col. 2, line 55.  Change "a" to -- an --.

Col. 3, line 6.   Change "To" to -- to --.

Col. 3, line 55.  Change "97" to -- 97, --.

Col. 4, line 33.  Change "cassette i" to -- cassette 1 --.

Col. 6, line 45.  Change "De" to -- be --.

Col. 8, line 16.  After "said" insert -- recording --.

Signed and Sealed this

Sixteenth Day of May, 1995

Attest:

BRUCE LEHMAN

Attesting Officer

Commissioner of Patents and Trademarks